US011343545B2

(12) United States Patent
Pinel et al.

(10) Patent No.: US 11,343,545 B2
(45) Date of Patent: May 24, 2022

(54) COMPUTER-IMPLEMENTED EVENT DETECTION USING SONIFICATION

(71) Applicant: International Business Machines Corporation, Armonk, NY (US)

(72) Inventors: Florian Pinel, New York, NY (US); Brent Gross, Calgary (CA); Charles Daniel Wolfson, Austin, TX (US)

(73) Assignee: International Business Machines Corporation, Armonk, NY (US)

(*) Notice: Subject to any disclaimer, the term of this patent is extended or adjusted under 35 U.S.C. 154(b) by 222 days.

(21) Appl. No.: 16/366,003

(22) Filed: Mar. 27, 2019

(65) Prior Publication Data
US 2020/0314458 A1 Oct. 1, 2020

(51) Int. Cl.
| H04N 21/233 | (2011.01) |
| H04N 21/80 | (2011.01) |
| H04N 21/234 | (2011.01) |
| G06N 20/00 | (2019.01) |
| G06F 16/783 | (2019.01) |
| G06V 20/40 | (2022.01) |

(52) U.S. Cl.
CPC ....... *H04N 21/233* (2013.01); *G06F 16/7834* (2019.01); *G06N 20/00* (2019.01); *G06V 20/41* (2022.01); *H04N 21/23418* (2013.01); *G06V 20/44* (2022.01)

(58) Field of Classification Search
CPC .......................... H04N 21/234; H04N 21/2552
See application file for complete search history.

(56) References Cited

U.S. PATENT DOCUMENTS

| 7,433,495 | B2 | 10/2008 | Rui et al. |
| 8,135,221 | B2 | 3/2012 | Jiang et al. |
| 8,849,432 | B2 | 9/2014 | Moorer |
| 8,867,891 | B2 | 10/2014 | Jiang et al. |
| 9,495,591 | B2 | 11/2016 | Visser et al. |
| 9,548,048 | B1* | 1/2017 | Solh ........................ G06V 40/20 |
| 9,736,580 | B2 | 8/2017 | Cahill et al. |
| 2004/0174431 | A1* | 9/2004 | Stienstra .......... H04N 21/42201 348/155 |

(Continued)

OTHER PUBLICATIONS

"Sonification", https://en.wikipedia.org/wiki/Sonification, accessed Jan. 7, 2019.

(Continued)

*Primary Examiner* — Mushfikh I Alam
(74) *Attorney, Agent, or Firm* — Stephanie L. Carusillo

(57) ABSTRACT

Computer-implemented event detection includes obtaining, at one or more processors, multimedia data including multiple frames of video data and corresponding audio data. The processor(s) process the multiple frames to detect at least one object and to track the object(s) between two or more of the frames. The processor(s) generate sonification audio data representing a position of the object(s) in the two or more frames, movement of the object(s), or both the position and the movement of object(s). The processor(s) generate combined audio data including the audio data and the sonification audio data. The processor(s) generate one or more feature vectors representing the combined audio data and provide the feature vector(s) as input to a trained event classifier to detect an event represented in the multimedia data.

20 Claims, 7 Drawing Sheets

(56) References Cited

U.S. PATENT DOCUMENTS

| | | | | |
|---|---|---|---|---|
| 2005/0076161 | A1* | 4/2005 | Albanna | A63F 13/212 |
| | | | | 710/15 |
| 2010/0054694 | A1* | 3/2010 | Liu | G11B 27/034 |
| | | | | 386/285 |
| 2010/0098258 | A1* | 4/2010 | Thorn | H04N 21/439 |
| | | | | 381/1 |
| 2011/0285821 | A1* | 11/2011 | Ogawa | H04N 21/47202 |
| | | | | 348/46 |
| 2013/0253834 | A1* | 9/2013 | Slusar | G01C 21/3608 |
| | | | | 701/540 |
| 2014/0023348 | A1* | 1/2014 | O'Kelly | G11B 27/031 |
| | | | | 386/278 |
| 2014/0101238 | A1* | 4/2014 | Soon-Shiong | H04W 4/50 |
| | | | | 709/203 |
| 2015/0350716 | A1* | 12/2015 | Kruglick | H04N 21/44008 |
| | | | | 386/241 |
| 2016/0180865 | A1 | 6/2016 | Citerin et al. | |
| 2017/0286056 | A1 | 10/2017 | Pozos et al. | |
| 2018/0035075 | A1* | 2/2018 | Lee | H04N 5/772 |
| 2018/0054689 | A1 | 2/2018 | Chen et al. | |
| 2018/0098034 | A1* | 4/2018 | Altuev | H04L 69/161 |
| 2018/0232947 | A1* | 8/2018 | Nehmadi | G01S 17/931 |
| 2019/0057258 | A1* | 2/2019 | Simske | G06K 9/00718 |
| 2019/0114804 | A1* | 4/2019 | Sundaresan | G06K 9/66 |
| 2020/0053401 | A1* | 2/2020 | Obara | H04N 21/24 |

OTHER PUBLICATIONS

He, Weipeng, et al., "Multimodal Object Recognition from Visual and Audio Sequences", 2015 IEEE International Conference on Multisensor Fusion and Integration for Intelligent Systems (MFI), San Diego, CA, USA, Sep. 14, 2015, 133-138.

Jie, Luo, et al., "Object Category Detection using Audio visual Cues", Computer Vision Systems. ICVS 2008. Lecture Notes in Computer Science, vol. 5008. Springer, Berlin, Heidelberg; DOI: https://doi.org/10.1007/978-3-540-79547-6_52, 2008, 539-548.

Khalidov, Vasil, et al., "Detection and Localization of 3D Audio-Visual Objects Using Unsupervised Clustering", ICMI '08 Proceedings of the 10th international conference on Multimodal interfaces, Chania, Crete, Greece DOI: http://dx.doi.org/10.1145/1452392.1452438, Oct. 20, 2008, 217-224.

Lacheze, Loic, et al., "Audio/Video Fusion for Objects recognition", 2009 IEEE/RSJ International Conference on Intelligent Robots and Systems, St. Louis, MO, USA; DOI: http://dx.doi.org/10.1109/IROS.2009.5354442, Oct. 10, 2009, 652-657.

Landry, Steven, "Developing a dancer sonification system using the Immersive Interactive Sonification Platform (iISoP)", 2016.

O'Rourke, Damien, et al., "Demo Abstract: Fusion of Audio and Image Information for Efficient Object Detection and Capture", 2009 International Conference on Information Processing in Sensor Networks (ISPN), San Francisco, CA, USA, Apr. 13, 2009, 401-402.

Piczak, Karol J., "Environmental Sound Classification With Convolutional Neural Networks", 2015 IEEE International Workshop on Machine Learning for Signal Processing, Boston, MA, USA, Sep. 17, 2015.

Shahbazova, Shahnaz, et al., "The Development of an Algorithmic Model for Object Recognition From Visual and Sound Information—Based on Neuro-Fuzzy Logic", 2011 Annual Meeting of the North American Fuzzy Information Processing Society; El Paso, TX, USA, DOI: 10.1109/NAFIPS.2011.5751923, Mar. 18, 2011, 1-6.

Subetha, T., et al., "A Survey on Human Activity Recognition from Videos", International Conference on Information Communication and Embedded System (ICICES 2016); Chennai, India; DOI: 10.1109/ICICES.2016.7518920, Feb. 25, 2016.

* cited by examiner

COMPUTER-IMPLEMENTED EVENT DETECTION USING SONIFICATION

BACKGROUND

The present disclosure relates to event detection, and more specifically, to machine learning-based event detection using sonification.

Automated event classification is challenging, in part, because it can be difficult to detect and classify some events using only one type of media (e.g., only audio or only video). Even humans can find it difficult to classify some events based only on one type of media. For example, a human (or a computer) may have difficulty determining whether a vacuum cleaner depicted in a video stream has been activated without hearing audio content associated with the video stream. Conversely, the human (or the computer) may be able to listen to the audio content and determine that some loud event has occurred, but may not be able to tell, from the audio content alone, whether the event was a vacuum cleaner or a car engine.

Further, it can be challenging and resource intensive to process both audio and video data together for automated event detection. For example, one challenge associated with automated event detection using both audio and video is the significant data set mismatch between video data and audio data. Video tends to have a much larger bit rate than audio. As a result, audio can be processed much more quickly and using fewer processing resources, which can lead to challenges with data synchronization between audio processing operations and video processing operations.

SUMMARY

According to an embodiment of the present invention, a computer-implemented method of event detection includes obtaining multimedia data including multiple frames of video data and audio data corresponding to the video data. The method also includes processing the multiple frames of video data to detect at least one object depicted in the video data and to track the at least one object between two or more frames of the multiple frames. The method further includes generating sonification audio data representing a position of the at least one object in the two or more frames, movement of the at least one object in the two or more frames, or both the position and the movement of the at least one object in the two or more frames. The method also includes generating combined audio data including the audio data and the sonification audio data and providing input based on the combined audio data to a trained event classifier to detect an event represented in the multimedia data.

According to an embodiment of the present invention, a system for event detection includes one or more processors and one or more memory devices coupled to the one or more processors. The one or more memory devices store instructions that are executable by the one or more processors to perform operations including obtaining multimedia data including multiple frames of video data and audio data corresponding to the video data. The operations also include processing the multiple frames of video data to detect at least one object depicted in the video data and to track the at least one object between two or more frames of the multiple frames. The operations further include generating sonification audio data representing a position of the at least one object in the two or more frames, movement of the at least one object in the two or more frames, or both the position and the movement of the at least one object in the two or more frames. The operations also include generating combined audio data including the audio data and the sonification audio data and providing input based on the combined audio data to a trained event classifier to detect an event represented in the multimedia data.

According to an embodiment of the present invention, a computer program product for event detection includes a computer readable storage medium having program instructions embodied therewith. The program instructions are executable by one or more processors to perform operations including obtaining multimedia data including multiple frames of video data and audio data corresponding to the video data. The operations also include processing the multiple frames of video data to detect at least one object depicted in the video data and to track the at least one object between two or more frames of the multiple frames. The operations further include generating sonification audio data representing a position of the at least one object in the two or more frames, movement of the at least one object in the two or more frames, or both the position and the movement of the at least one object in the two or more frames. The operations also include generating combined audio data including the audio data and the sonification audio data and providing input based on the combined audio data to a trained event classifier to detect an event represented in the multimedia data.

DETAILED DESCRIPTION

Systems, methods, and computer-program products disclosed herein describe computer-implemented event detection and classification based on multimedia content (e.g., audio and corresponding video). Aspects of the video content that are relevant to event detection are converted into audio content via a sonification process. The audio content derived from the video content is combined with the original audio content of the multimedia content to generate combined audio content. The combined audio content is processed using one or more machine learning techniques to detect and classify events.

The audio content derived from the video content (referred to herein as sonification audio data) is much smaller than (e.g., has a lower bit rate than) the original video data;

however, the sonification audio data retains information from the video content that can be used for event detection and classification. For example, the sonification audio data can include (or represent) information about the identity, position, size, and/or trajectory of objects depicted in the video content. Sonification of information derived from the video content provides a more evenly balanced data set between audio and video (e.g., a data set in which information derived from the video content is more evenly matched in size with information derived from the audio content). Additionally, a smaller feature vector can be used to represent the data set that includes the audio data and the sonification audio data than would be needed to represent the audio data and the original video data. Using a smaller feature vector enables use of a less complex machine learning classifier, which requires less computing resources to perform event detection and classification.

Figure 1:
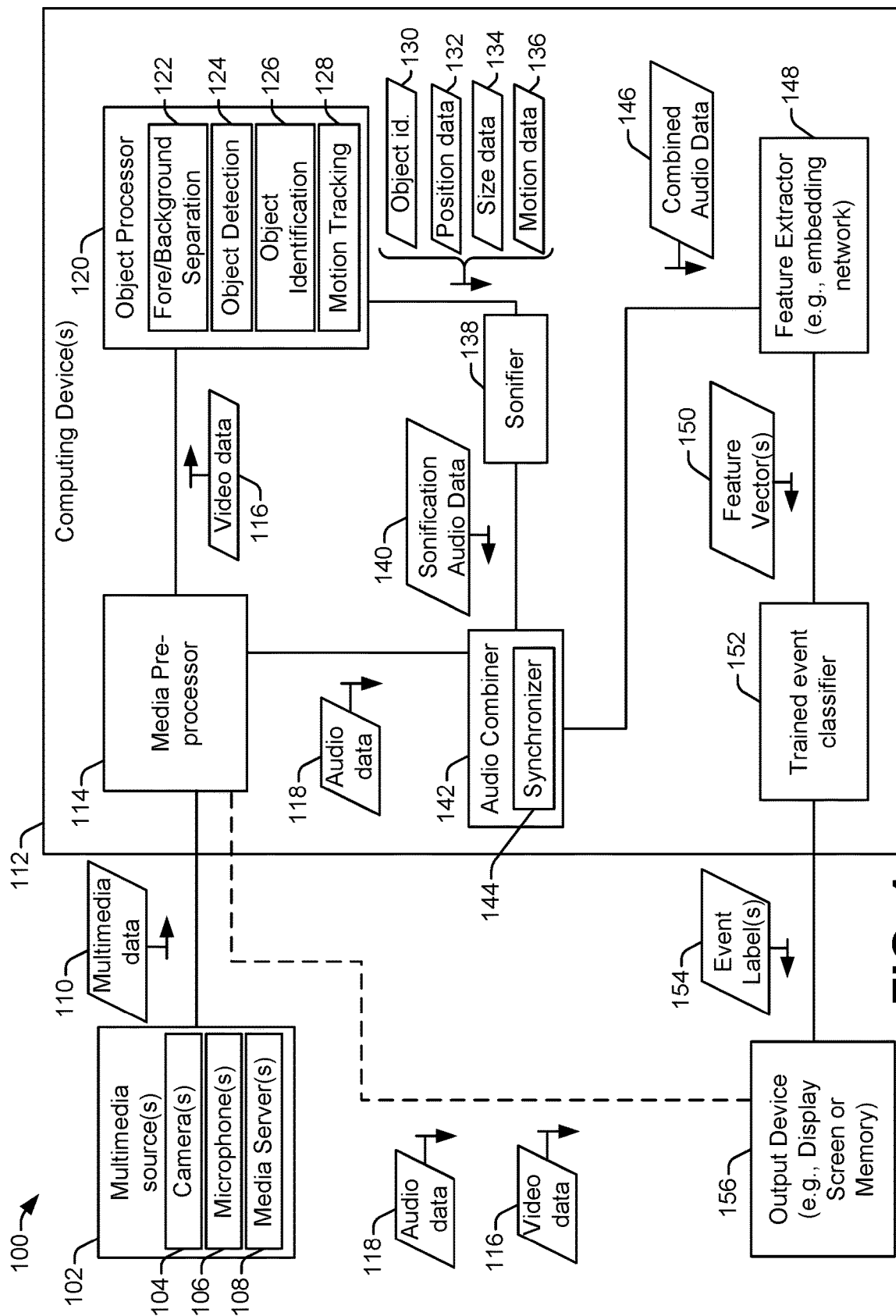
FIG. 1 is a diagram that illustrates an example a system for event detection according to an embodiment of the present invention.

FIG. 1 is a diagram that illustrates an example of a system 100 for event detection according to an embodiment of the present invention. The system 100 includes one or more multimedia sources 102 and one or more computing devices 112. The multimedia source(s) 102 can include one or more cameras 104 and one or more microphones 106 to capture live multimedia content (e.g., multimedia data 110), or the multimedia source(s) 102 can include media servers 108 to provide pre-recorded or stored multimedia data 110. In some implementations, the multimedia source(s) 102 are integrated within the computing device(s) 112. For example, a particular computing device, such as a mobile phone or portable computing device, can include a camera and a microphone along with one or more processors and one or more memory devices. In some implementations, the multimedia source(s) 102 are coupled to the computing device(s) 112 via a local wired or wireless connection (e.g., via a local area network, a local area wireless network, or a serial or parallel bus connection) or from a remote location via one or more wide area networks (e.g., an enterprise network or the Internet). For example, a particular multimedia source can include a remote device with a camera and a microphone. In this example, the remote device can packetize the multimedia data 110 and transmit the multimedia data 110 to the computing device 112 via a network (not shown). As another example, a particular multimedia source can include or be coupled to a media storage system. In this example, the particular multimedia source can transmit pre-recorded media, as the multimedia data 110, to the computing device(s) 112 via a local connection or via a network.

The multimedia data 110 includes video data representing a plurality of frames of video content and includes audio data corresponding to the video data. The multimedia data 110 can be compressed, uncompressed, or portions can be compressed and other portions uncompressed. For example, the multimedia data 110 can include or correspond to a media stream that is compressed in compliance with a Moving Picture Experts Group (MPEG) specification (e.g., an MPEG-4 specification). In another example, the multimedia data 110 can include or correspond to a media stream that is transmitted according to a High-Definition Multimedia Interface (HDMI) specification, which can include uncompressed video data and compressed or uncompressed audio data. In yet another example, video content of the multimedia data 110 can be transmitted to the computing device(s) 112 separately from corresponding audio content of the multimedia content 110. For example, the audio content can be transmitted along with corresponding synchronization data, such as timestamp data and/or a packet sequence number, from the multimedia source(s) 102 according to a first protocol or via a first communication path, and the video content can be transmitted along with corresponding synchronization data, such as timestamp data and/or a packet sequence number, from the multimedia source(s) 102 according to a second protocol or via a second communication path.

Figure 7:
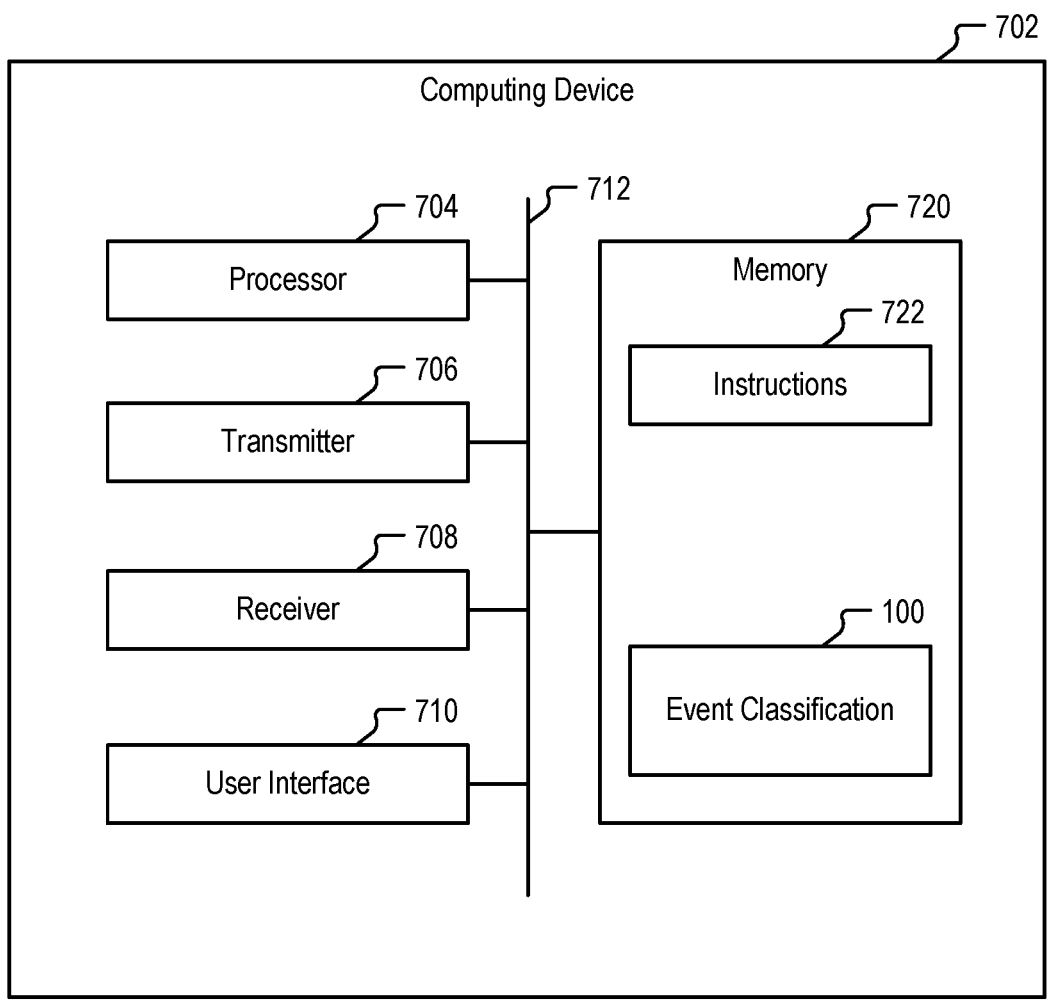
FIG. 7 illustrates a diagram of a computing device configured to perform event detection according to an embodiment of the present invention.

The computing device(s) 112 include one or more processor (such as a processor 704 of FIG. 7) and one or more memory devices (such as a memory 720 of FIG. 7). The computing device(s) 112 also include interface components (such as a receiver 708 of FIG. 7) to receive the multimedia data 110 and interface components (such as a transmitter 706 and/or a user interface 710) to output results, such as one or more event labels 154 to an output device 156. FIG. 1 illustrates various functional modules of the computing device(s) 112 including a media pre-processor 114, an object processor 120, a sonifier 138, an audio combiner 142, a feature extractor 148, and a trained event classifier 152. In some implementations, one or more of the illustrated functional modules includes or corresponds to a special-purpose hardware device (e.g., application specific integrated circuits, field programmable gate arrays, and buffers or other memory devices). In some implementations, one or more of the functional modules includes or corresponds to a programmable hardware device (e.g., application processing units (APUs), graphics processing units (GPUs), or other single-core or multi-core processor circuitry) executing instructions to perform the operations described herein. In some implementations, one or more of the functional modules includes or corresponds to a mix of special-purpose devices and programmable hardware devices (e.g., interface circuitry and amplifiers coupled to a programmable device that operates as a Coder/Decoder (CODEC)). Further, in addition to the various functional modules illustrated in FIG. 1, the computing device(s) 112 can include other components and circuitry.

The media pre-processor 114 is configured to receive the multimedia data 110 and prepare the multimedia data 110 for processing by other components of the computing device(s) 112. For example, the media pre-processor 114 can include or be coupled to interface components, such as one or more receivers, one or more media ports, one or more data bus ports, one or more network connectors, etc. In some implementations, the media pre-processor 114 also includes a media CODEC. If the multimedia data 110 includes compressed data, the media pre-processor 114 can perform decompression operations. For example, some media compression techniques compress media by encoding some frames (referred to as I-frames), very little or not at all and compressing other frames (e.g., referred to as P-frames and B-frames) more based on differences between various video frames. If the multimedia data 110 uses such a media compression technique, the media pre-processor 114 includes circuitry to enable decompression of the multimedia data 110 by, for example, buffering some frames of video content from the media data, comparing some compressed frames to other frames to reproduce uncompressed versions of the compressed frames, etc. The media pre-processor 114 can also, or in the alternative, perform audio decompression if audio content of the multimedia data 110 is compressed.

In some implementations, the multimedia source(s) 102 packetizes the media content to form the multimedia data 110 and transmit packets including the multimedia data 110 in a manner that does not guarantee receipt of all of the packets of the multimedia data 110 or that does not guarantee that the packets of the multimedia data 110 will be received in proper order. In such implementations, the media pre-processor 114 includes circuitry (or instructions) to identify missing or corrupt packets, to request retransmission of some packets, to perform error correction of some packets, and/or to buffer and reorder packets.

After the various operations are performed by the media pre-processor 114, the media pre-processor 114 outputs video data 116 including a plurality of frames of video content and audio data 118 corresponding to the video content. The audio data 118 can include an analog audio stream or a digital representation of an audio stream (e.g., a plurality of frames of audio content). In a particular implementation, the video data 116, the audio data 118, or both, is stored in a memory (such as the memory 720 of FIG. 7) until retrieved by one of the other processing modules of the computing device 112. Alternatively, the video data 116, the audio data 118, or both, can be provided as input to one or more of the other processing modules.

In the example illustrated in FIG. 1, the video data 116 is provided as input to the object processor 120. The object processor 120 includes special-purpose circuitry, programmable circuitry, or a combination thereof, to perform object detection and tracking based on the video data 116. In some implementations, the object processor 120 also performs object identification to recognize a particular detected object.

In a particular implementation, the object processor 120, in response to receiving a particular frame of the video data 116, separates the particular frame into foreground components (e.g., pixels that represent objects in the foreground of the frame) and background components (e.g., pixels that represent objects or aspects of in the background of the particular frame). For example, a foreground/background separation module 122 can separate or identify foreground and background portions of a frame by comparing two or more frames and labeling as background those pixels that are unchanged or nearly unchanged in the two or more frames. In other examples, an image model that has been trained or programmed to identify the background portion of images can be used to separate the foreground and background of a frame. For example, if the video data 116 corresponds to video captured by a stationary security camera, an image model that represents background pixels captured under certain conditions (e.g., particular lighting conditions) can be used to distinguish the foreground and background components.

An object detection module 124 of the object processor 120 can detect one or more objects (or one or more specific types of objects, such as people or faces) in one or more frames of the video data 116. In some implementations, the foreground portions of the video data 116 (as identified by the foreground/background separation module 122) are searched to identify the object(s). The object detection module 124 can use one or more relatively simple detection processes, such as boundary or edge detection, by evaluating pixel-to-pixel changes within a frame. In some implementations, the object detection module 124 uses such simple boundary detection operations to identify a bounded set of pixels (which may be referred as a "blob" or a blob of pixels) that have similar properties (e.g., color, intensity, proximity to one another, etc.) and therefore appear to represent a single object. In other implementations, the object detection module 124 also, or in the alternative, uses a more sophisticated object detection process, such as using a neural network that is trained to detect an object within a single frame or multiple frames or that is trained to both detect and identify the object.

The object detection module 124 generates object data based on one or more detected objects. The object data includes information that is relevant to event detection and classification and is descriptive of one or more objects detected in one or more frames of the video data 116. In various implementations, the object data includes one or more of an object identifier 130, position data 132, size data 13, motion data 136, other data descriptive of one or more objects depicted in the video data 116, or combinations thereof.

In a particular implementation, the position data 132 indicates a location (e.g., one or more pixel coordinates) of a detected object. To illustrate, after the object detection module 124 identifies a bounded set of pixels corresponding to an object, the object detection module 124 can calculate a centroid of the bounded set of pixels, and the pixel coordinate location of the centroid is used as the position data 132 for the object. In some implementations, the position data 132 represents relative positions of two or more detected objects from a particular frame of the video data 116. To illustrate, the position data 132 can indicate a distance between centroids of the two or more objects.

In a particular implementation, the size data 134 indicates a size of (e.g., a number of pixel corresponding to) the detected object. For example, the size data 134 can indicate that the object is represented in the frame by a specified number of pixels or by a specified number of columns of pixels and a specified number of rows of pixels. In some implementations, the position data 132 and the size data 134 can be combined. For example, combined position and size data can be specified as pixel coordinates of a bounding box around the object in a particular frame of the video data 116. In some implementations, the size data 134 indicates a relative size of a detected object. To illustrate, the size data 134 can indicate that a particular fraction of the foreground pixels of a frame of the video data 116 correspond to the object.

In the example illustrated in FIG. 1, the object processor 120 includes an object identification module 126 that is separate from the object detection module 124. In some implementations, a machine learning model can be trained to perform both object detection and object identification, in which case the object detection and object identification modules 124 and 126 can be merged. In other implementations, results of the object detection operations performed by the object detection module 124 (e.g., determining boundaries of pixels representing objects in the foreground) are used as input to the object identification module 126.

Object identification is a type of a classification problem; accordingly, the object identification module 126 includes a classifier that is configured (e.g., trained using a machine learning process) to distinguish between two or more types of objects. Examples of trained classifiers that can be used for object identification include perceptrons, decision trees, support vector machines, and neural networks (e.g., convolutional neural networks). The object identification module 126, if present, generates the object id. 130 for recognized objects. Some objects depicted in a frame of the video data 116 may not be recognized by the object identification module 126, in which case the object identification module 126 does not generate a corresponding object identifier ("id.") 130 or the object identification module 126 generates an object id. 130 indicating that the object is not recognized.

In the example of FIG. 1, the object processor 120 also includes a motion tracking module 128. The motion tracking module 128 uses information generated by the object detection module 124 for multiple frames of the video data 116 to generate motion data 136. For example, by comparing the position data 132 and the size data 134 for a first frame to the position data 132 and the size data 134 for a subsequent frame, the motion tracking module 128 can estimate a trajectory of a detected object and generate the motion data 136 to describe the trajectory.

The object processor 120 outputs object data including, for example, the object id. 130, the position data 132, the size data 134, the motion data 136, other data descriptive of one or more objects detected in one or more frames of the video data 116, or a combination thereof. The object data can be stored in a memory or provided as input to another module, such as to the sonifier 138 as illustrated in FIG. 1.

The sonifier 138 processes the object data to generate sonification audio data 140. The sonifier 138 calculates audio characteristics based on the object data. For example, the sonifier 138 can use a formula (e.g., a calculation) to determine a specific frequency of a sound to represent any object detected at a specific position. To illustrate, the formula can relate the frequency of the sound to a coordinate location indicated by position data 132.

In a more complex example, the sonifier 138 can access audio mapping data (e.g., one or more look-up tables). In this example, the audio mapping data can specify particular audio parameters to represent particular aspects of the object data. To illustrate, audio mapping data can include a table or other data structure that specifies audio frequencies to be used in the sonification audio data 140 to represent particular types or values of the object id. 130. As a specific example, the audio mapping data can indicate that a sound with a frequency of 25,000 Hz is to be added to the sonification audio data 140 when the object id. 130 indicates that a particular frame includes an image of any person. As another specific example, the audio mapping data can indicate that sounds within a range of audio frequencies (e.g., from about 25,000 Hz to about 30,000 Hz) are to be used to represent people, and the sonifier 138 can use different sub-ranges of this range of audio frequencies to represent different people. Thus, if a frame includes images of two different people, the sonifier 138 can include two sounds (e.g., one at 25,000 Hz and one at 26,000 Hz) to represent the two people. Other ranges of frequencies can be mapped to other types of objects, such as weapons, vehicles, consumer goods, or objects associated with particular activities (e.g., balls, rackets, etc.).

In a particular implementation, the frequencies used by the sonifier 138 to represent the object data are outside a human audible frequency range. To illustrate, according to some sources, a typical human auditory frequency range is from about 20 Hz to about 20,000 Hz. Based on an assumption that this reported frequency range is normative and correct, the sonifier 138 can represent the object data using frequencies below 20 Hz, above 20,000 Hz, or both. In some implementations, the computing device(s) 112 can output sound based on combined audio data 146 that includes the sonification audio data 140. In such implementations, a safety margin can separate the range of frequencies used for the sonification audio data 140 and the reported human auditory frequency range to avoid distortion of the audio data 118 by the sonification audio data 140. For example, the sonifier 138 can represent the object data using frequencies below 10 Hz, above 25,000 Hz, or both.

As one example of sonification of the object data, the object data can include the position data 132 representing a first coordinate location of a first object in a first frame of the video data 116. In this example, the sonifier 138 determines, based at least partially on the first coordinate location, a first audio parameter value to represent the position of the object. The first audio parameter value indicates one or more frequencies of a sound, one or more amplitudes of the sound, one or more durations of the sound, modulation of the sound, or a combination thereof. In this example, the object data can also include motion data 136 representation a motion of the first object or a change of position of the first object in the first frame relative to the position of the first object in a prior frame. In this example, the sonifier 138 determines, based at least partially on the motion data 136, a second audio parameter value to represent the motion of the object. The second audio parameter value is a different parameter type than the first audio parameter value. To illustrate, if the first audio parameter value was a frequency value, the second audio parameter value can include one or more of an amplitude, a duration, a modulation, a pattern, or a combination thereof. In this example, the sonifier 138 generates the sonification audio data 140 based on the first audio parameter value and the second audio parameter value. In other examples, the sonification audio data 140 is based on other audio parameter values to represent other portions of the object data, to represent other detected objects, or both.

Although sound frequency is used in the examples above as one example of an audio characteristic that can be used to generate the sonification audio data 140, other audio characteristics can be used in addition to or instead of frequency. For example, an amplitude or a frequency of a sound can be modulated or modified to represent object data. As another example, multiple tones (e.g., pulses, each with the same frequency, duration, and amplitude or with different frequencies, durations, and/or amplitudes) can be used to represent object data.

As a particular example, the position data 132 of a detected object can be mapped to a sound that initially has a particular frequency, and the frequency of the sound can be modified to represent the motion data 136 of the object. To illustrate, if the object is moving upward, the frequency can be increased, and if the object is moving downward, the frequency can be decreased. As a further illustration, the amplitude of the sound can be increased if the motion data 136 indicates that the object is moving to the right and decreased if the object is moving to the left. Other examples of audio characteristics that can be mapped to object data to generate the sonification audio data include waveform shape, pulse pattern (e.g., rhythm), or any other orthogonal audio characteristic. As used herein, a first characteristic is "orthogonal" to a second audio characteristics if the first audio characteristic can be controlled or specified independently of the second audio characteristic.

The sonification audio data 140 and the audio data 118 from the multimedia data 110 can be provided as input to the audio combiner 142. The sonification audio data 140 and the audio data 118 can be included in or correspond to digital signals or analog signals. In the example illustrated in FIG. 1, the audio combiner 142 includes a synchronizer 144. The synchronizer 144 includes a circuit or software executable by a processor to time align the audio data 118 and the sonification audio data 140 such that portions of the sonification audio data 140 that correspond to a particular frame of the video data 116 are aligned with portions of the audio data 118 that correspond to the particular frame. For example, in an implementation in which the sonification audio data 140 and the audio data 118 are included in digital signals, the digital signals can include a plurality of data frames, each associated with a time stamp or a sequence number indicating a playout order of the data frames. In such an implementation, the synchronizer 144 uses the time stamps or sequence numbers to time align the sonification audio data 140 and the audio data 118. In an implementation in which the sonification audio data 140 and the audio data 118 are included in analog signals, the synchronizer 144 can include a delay element to delay the audio data 118 to account for processing time to generate the sonification audio data 140 to time align the audio data 118 and the sonification audio data 140.

After the synchronizer 144 aligns the sonification audio data 140 and the audio data 118, the audio combiner 142 combines the sonification audio data 140 and the audio data 118 to generate combined audio data 146. The combined audio data 146 is provided as input to the feature extractor 148.

The feature extractor 148 can include, for example, a trained embedding network to generate a feature vector 150 that represents the combined audio data 146. As explained above, the combined audio data 146 includes the audio data 118 and the sonification audio data 140, and the sonification audio data 140 encodes or represents the object data output by the object processor 120 based on the video data 116. Thus, the combined audio data 146 includes information that is relevant to event detection from both the video data 116 and the audio data 118. However, the combined audio data 146 is a more compact representation of the relevant information than is the multimedia data 110. For example, the multimedia data 110 uses a particular number of bits to represent a particular period of time (e.g., one minute) based on the bit rate of the multimedia data 110. The combined audio data 146 uses fewer bits to represent the audio data 118 and the sonification audio data 140 for the same particular period of time. Accordingly, the feature vector(s) 150 used to represent the combined audio data 146 can be smaller (e.g., include fewer features or fewer bits) than a feature vector to represent the multimedia data 110.

The feature vector(s) 150 are provided as input to a trained event classifier 152. In some implementations, the trained event classifier 152 includes (e.g., incorporates the functionality of) the feature extractor 148. In such implementations, the combined audio data 146 is provided as input to the trained event classifier 152 without being subjected to a separate feature extraction process. The trained event classifier 152 is a machine learning classifier that has been trained (e.g., via a supervised learning process using labeled training data) to label events based on the feature vector(s) 150 (or based on the combined audio data 146). For example, events represented in training multimedia content can be labeled (e.g., assigned to event-type categories) by a person and can subsequently be used as supervised training data to train a machine learning model to recognize and label events based on the feature vector(s) 150. Examples of machine learning models that can be used by the trained event classifier include perceptrons, artificial neural networks, decision trees, naive Bayes classifiers, or support vector machines.

The trained event classifier 152 generates output, such as event labels 154, which can be provided to an output device 156. The event label(s) 154 identify one or more events or one or more types of events detected in the multimedia content 110 by the computing device 112.

In a particular implementation, the output device 156 is configured to output the event labels 154 in combination with (e.g., concurrently with) the audio data 118 and the video data 116. For example, the output device 156 can include a multimedia device (e.g., a display screen and speaker) that outputs the video data 116 and the audio data 118 along with information derived from the event labels 154 (such as text overlaying a portion of a display of the video data 116). In another example, the output device 156 includes a multimedia storage device (e.g., a digital media recorder) that stores the video data 116 and the audio data 118 along with information derived from the event labels 154. In some implementations, the output device 156 includes an alarm system that generates an output (e.g., an alert sound and/or a display of the video data 116 and the audio data 118) based on content of the event labels 154.

As a specific example, the output device 156 can overlay the event label(s) 154 or information descriptive of the event label(s) 154 on the video content from the multimedia data 110. To illustrate, if the multimedia data 110 represents a sporting event, and a scoring event (e.g., a goal) is detected by the computing device(s) 112 using the operations described above, the video content of the sporting event can be displayed at the output device 156, and a label indicating that a scoring event occurred can be overlaid on the video content of the sporting event.

In some implementations, operations of the output device 156 are controlled or controllable based on the event label(s) 154. For example, the output device 156 can be triggered to output or store in persistent memory particular content of the multimedia data 110 based on the event label(s) 154. To illustrate, the output device 156 can buffer the multimedia content 110 in a temporary buffer during normal operation (e.g. to store the last 10 minutes of content) and can move contents of the buffer to persistent memory in response to an event label 154 indicating that a particular event has occurred. As a specific illustration, when the multimedia data 110 is from a security camera system, the output device 156 can include a media recorder device that retains, in the buffer, the last 24 hours' worth of multimedia content. In this specific example, some content is continuously overwritten and lost. However, if the computing device(s) 112 generates an event label 154 indicating that a particular type of event has been detected (such as a person closing a door or a vacuum cleaner being activated), the output device 156 can move multimedia content corresponding to and leading up to the event to a persistent memory to prevent loss of the content. The output device 156 can take different actions depending on the specific event label(s) 154 output by the computing device(s)112.

Using the operations described above, the computing device(s) 112 are able to efficiently (e.g., using relative few processing resources) and reliably detect and classify events represented in multimedia content 110. In some implementations, the computing device(s) 112 can perform the event classification in real-time or near-real time. For example, the multimedia data 110 can include or correspond to a compressed multimedia stream having a first frame rate. In this example, a first segment of the compressed multimedia stream can be decoded (or decoded and decompressed) during a first time period to generate an audio signal (e.g., the audio data 118) and a video signal (e.g., the video data 116) for a multimedia output device (e.g., the output device 156). In this example, the trained event classifier 152 can generate output (e.g., the event label(s) 154) indicating a classification assigned to a particular event detected in the first segment of the compressed multimedia stream during the first time period and the audio signal, the video signal, and the output indicating the classification assigned to the particular event can be concurrently provided to the multimedia output device at the first frame rate for output to a user.

Figure 2:
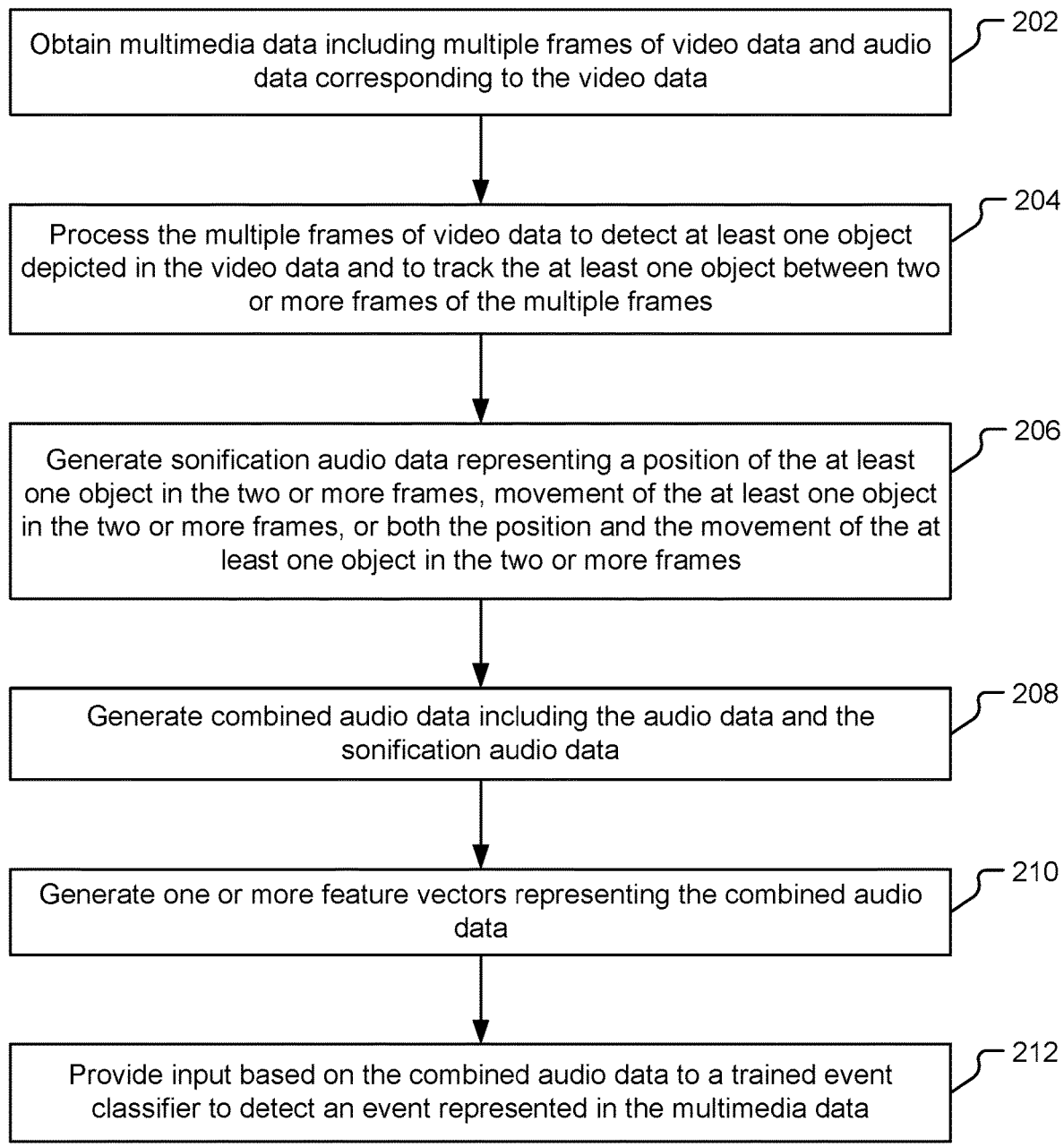
FIG. 2 is a flowchart that illustrates an example of a method of computer-implemented event detection according to an embodiment of the present invention.

FIG. 2 is a flowchart that illustrates an example of a computer-implemented method 200 of event detection according to an embodiment of the present invention. In some implementations, the method 200 is performed by the computing device(s) 112 of FIG. 1 or by one or more components thereof.

The method 200 includes, at 202, obtaining (e.g., by one or more processors of the computing device(s) 112) multimedia data including multiple frames of video data and audio data corresponding to the video data. For example, the computing device(s) 112 can obtain the multimedia data 110 from the multimedia source(s) 102. In some implementations, the multimedia data 110 includes, is included within, or corresponds to a compressed multimedia stream.

The method 200 also includes, at 204, processing (e.g., by the one or more processors) the multiple frames of video data to detect at least one object depicted in the video data and to track the at least one object between two or more frames of the multiple frames. For example, the media pre-processor 114 of the computing device(s) 112 can provide the video data 116 to the object processor 120. In this example, the object processor 120 includes special-purpose or programmable circuitry to detect objects depicted in frames of the video data 116, to identify the objects, to track the objects from frame-to-frame, etc. To illustrate, processing the multiple frames of video data to detect at least one object depicted in the video data and to track the at least one object between two or more frames of the multiple frames can include processing multiple frames of the video data 116 by the foreground/background separation module 122 to identify foreground portions of each frame and background portions of each frame. In this illustrative example, the object or objects detected in a particular frame are generally represented in the foreground portions of the particular frame.

In another illustrative example, processing the multiple frames of video data to detect at least one object depicted in the video data and to track the at least one object between two or more frames of the multiple frames can include processing multiple frames of the video data 116 by the object identification module 126 to identify a detected object. In yet another illustrative example, processing the multiple frames of video data to detect at least one object depicted in the video data and to track the at least one object between two or more frames of the multiple frames can include processing multiple frames of the video data 116 to determine a relative size of a detected object within a particular frame, to determine relative positions of two or more detected objects within a particular frame, or both.

The method 200 also includes, at 206, generating (e.g., by the one or more processors of the computing device(s) 112) sonification audio data representing the position of the at least one object in the two or more frames, the movement of the at least one object in the two or more frames, or both the position and the movement of the at least one object in the two or more frames. In some implementations, the sonification audio data corresponds to one or more sounds outside a human auditory range.

In some implementations, generating the sonification audio data representing the position of an object in a frame includes determining a first representative coordinate location of the first object in the first frame and determining, based at least partially on the first representative coordinate location, a first audio parameter value to represent the object. For example, the object processor 120 can determine a representative coordinate position (e.g., a centroid or a bounding box) of a detected object and indicate the representative coordinate position in the position data 132. In this example, the sonifier 138 generates the sonification audio data 140 by specifying a sound that indicates or represents the representative coordinate position. The sound can be represented by one or more audio parameter values, such as one or more frequencies of a sound, one or more amplitudes of the sound, one or more durations of the sound, modulation of the sound, or a combination thereof.

In some implementations, generating the sonification audio data representing motion of a first object includes, after determining a first representative coordinate position of the first object in a first frame, determining a second representative coordinate position of the first object in a second frame and determining a difference between the first representative coordinate position and the second representative coordinate position. In such implementations, the sonifier 138 can specify one or more audio parameter values (e.g., a second audio parameter value) of the sonification audio data 140 based at least partially on the difference between the first representative coordinate position and the second representative coordinate position. The one or more audio parameter values represent the motion of the first object. In other implementations, the sonifier 138 can specify other audio parameter values based on other object data from the object processor 120.

The method 200 also includes, at 208, generating combined audio data including the audio data and the sonification audio data. For example, the audio combiner 142 can combine (e.g., sum) analog signals corresponding to the audio data 118 and the sonification audio data 140. In another example, the audio combiner 142 receives the audio data 118 and the sonification audio data 140 in respective packet streams as digital representations of sound and generates a new packet stream that includes information from both the audio data 118 and the sonification audio data 140. In some implementations, generating the combined audio data includes synchronizing the sonification audio data and the audio data. For example, the synchronizer 144 of the audio combiner 142 can delay the audio data 118 to align the audio data 118 with the sonification audio data 140, or the synchronizer 144 can time align the audio data 118 and the sonification audio data 140 based on timestamps (or sequence numbers) associated with each.

In some implementations, the method 200 also includes, at 210, generating one or more feature vectors representing the combined audio data. For example, the feature extractor 148 can generate a feature vector 150 representing each frame or packet of the combined audio data 146. Alternatively, feature extraction can be performed within or as a part of a trained event classifier, in which case operations represented by block 210 can be omitted.

The method 200 also includes, at 212, providing input based on the combined audio data to a trained event classifier to detect an event (or multiple events) represented in the multimedia data. The trained event classifier includes or corresponds to one or more perceptrons, an artificial neural network, a decision tree, naive Bayes classifier, or a support vector machine. The feature vector(s) 150 or the combined audio data 146 are provided as input to the trained event classifier 152, which generates the event label(s) 154 based on the input. The computing device(s) 112 or another device, such as the output device 156, can use the event label(s) 154 for various purposes including, for example, determining whether to store the multimedia data 110 in persistent memory, alerting a user, or generating additional output.

One benefit of the method 200 is that it enables reliable, computer-implemented event detection and classification using relatively few processing resources. The event detection and classification is reliable since it is based on information derived from both video data and audio data. Further, the event detection and classification uses fewer computing resources (e.g., processor time, memory, etc.) by representing relevant portions of the video data as sonification audio data.

Figure 3:
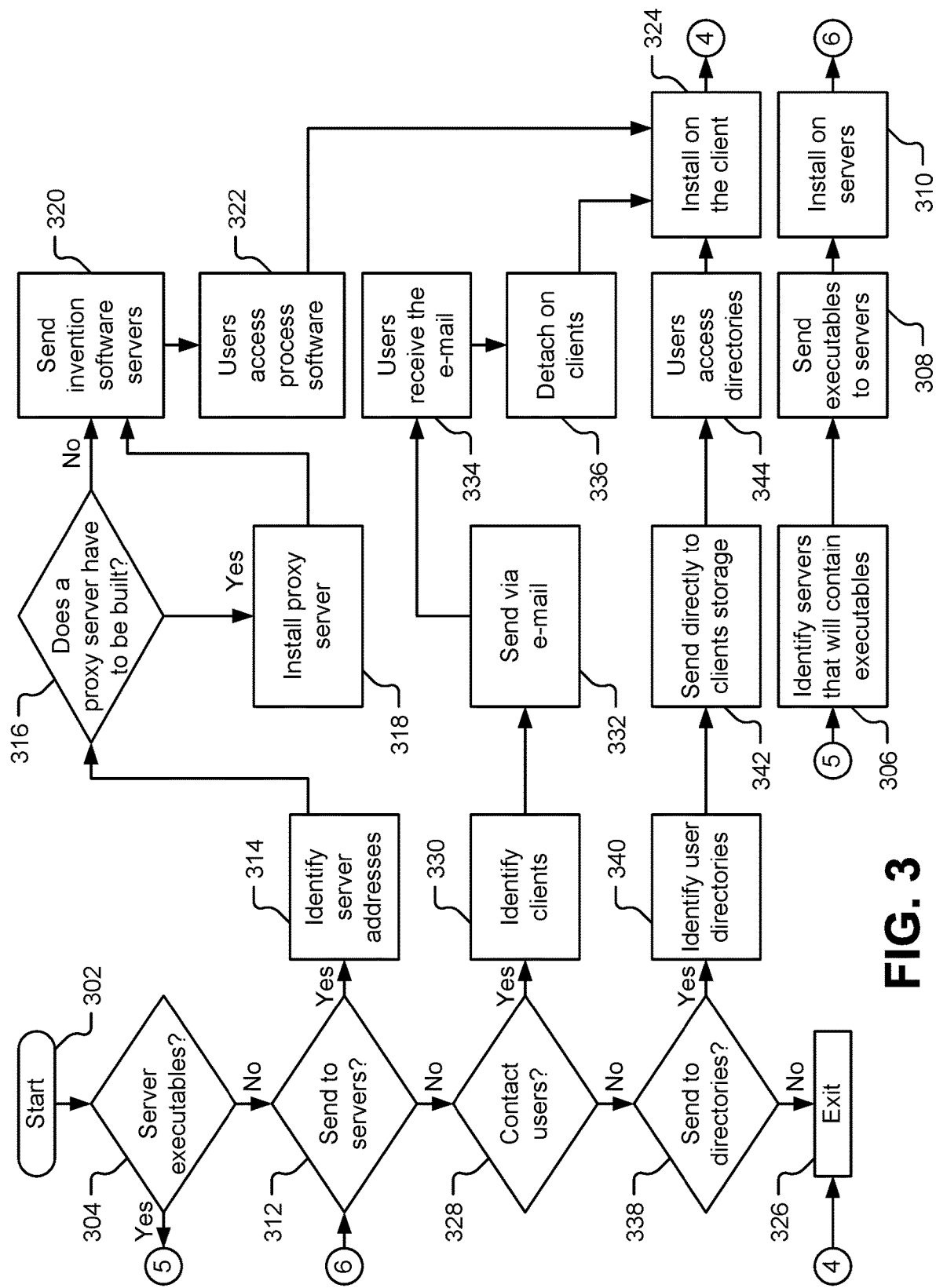
FIG. 3 is a flowchart that illustrates an example of a method of deploying software for computer-implemented event detection according to an embodiment of the present invention.

FIG. 3 is a flowchart that illustrates an example of a method of deploying software for computer-implemented event detection according to an embodiment of the present invention. While it is understood that process software for event detection (such as software or other processor executable instructions executed by the computing device(s) 112 of FIG. 1 or to perform the method 200 of FIG. 2) may be deployed by manually loading it directly in the client, server, and proxy computers via loading a storage medium such as a CD, DVD, etc., the process software may also be automatically or semi-automatically deployed into a computer system by sending the process software to a central server or a group of central servers. The process software is then downloaded into the client computers that will execute the process software. Alternatively, the process software is sent directly to the client system via e-mail. The process software is then either detached to a directory or loaded into a directory by executing a set of program instructions that detaches the process software into a directory. Another alternative is to send the process software directly to a directory on the client computer hard drive. When there are proxy servers, the process will select the proxy server code, determine on which computers to place the proxy servers' code, transmit the proxy server code, and then install the proxy server code on the proxy computer. The process software will be transmitted to the proxy server, and then it will be stored on the proxy server.

Step 302 begins the deployment of the process software. An initial step is to determine if there are any programs that will reside on a server or servers when the process software is executed (304). If this is the case, then the servers that will contain the executables are identified (306). The process software for the server or servers is transferred directly to the servers' storage via FTP or some other protocol or by copying though the use of a shared file system (308). The process software is then installed on the servers (310).

Next, a determination is made on whether the process software is to be deployed by having users access the process software on a server or servers (312). If the users are to access the process software on servers, then the server addresses that will store the process software are identified (314).

A determination is made if a proxy server is to be built (316) to store the process software. A proxy server is a server that sits between a client application, such as a Web browser, and a real server. It intercepts all requests to the real server to see if it can fulfill the requests itself. If not, it forwards the request to the real server. The two primary benefits of a proxy server are to improve performance and to filter requests. If a proxy server is required, then the proxy server is installed (318). The process software is sent to the (one or more) servers either via a protocol such as FTP, or it is copied directly from the source files to the server files via file sharing (320). Another embodiment involves sending a transaction to the (one or more) servers that contained the process software, and have the server process the transaction and then receive and copy the process software to the server's file system. Once the process software is stored at the servers, the users via their client computers then access the process software on the servers and copy to their client computers file systems (322). Another embodiment is to have the servers automatically copy the process software to each client and then run the installation program for the process software at each client computer. The user executes the program that installs the process software on his client computer (324) and then exits the process (326).

In step 328 a determination is made whether the process software is to be deployed by sending the process software to users via e-mail. The set of users where the process software will be deployed are identified together with the addresses of the user client computers (330). The process software is sent (332) via e-mail to each of the users' client computers. The users then receive the e-mail (334) and then detach the process software from the e-mail to a directory on their client computers (336). The user executes the program that installs the process software on his client computer (324) and then exits the process (326).

Lastly, a determination is made on whether the process software will be sent directly to user directories on their client computers (338). If so, the user directories are identified (340). The process software is transferred directly to the user's client computer directory (342). This can be done in several ways such as, but not limited to, sharing the file system directories and then copying from the sender's file system to the recipient user's file system or, alternatively, using a transfer protocol such as File Transfer Protocol (FTP). The users access the directories on their client file systems in preparation for installing the process software (344). The user executes the program that installs the process software on his client computer (324) and then exits the process (326).

Figure 4:
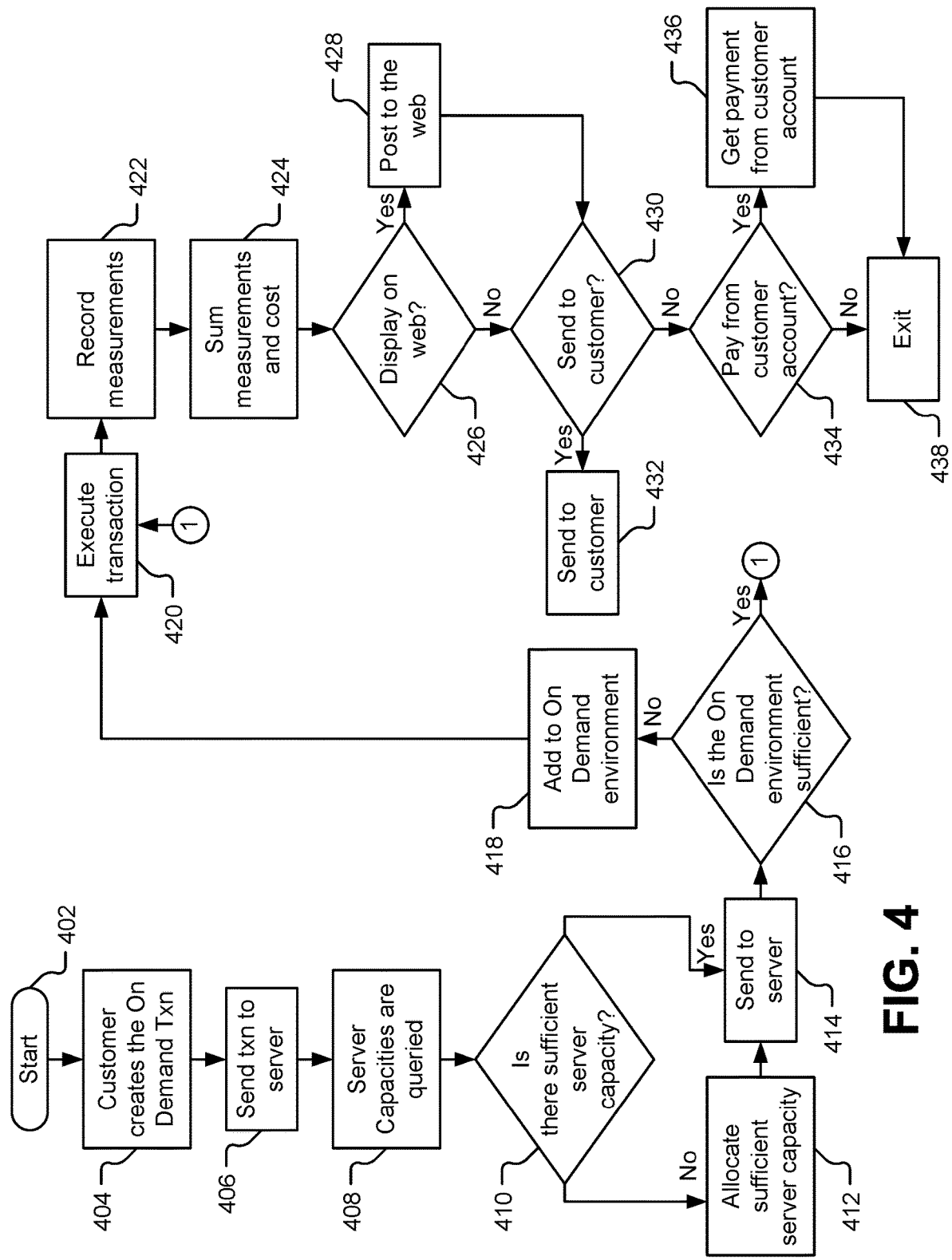
FIG. 4 is a flowchart that illustrates an example of a method of using computer-implemented event detection in an on demand context according to an embodiment of the present invention.

FIG. 4 is a flowchart that illustrates an example of a method of using computer-implemented event detection in an on demand context according to an embodiment of the present invention. In FIG. 4, the process software for computer-implemented event detection (such as software or other processor executable instructions executed by the computing device(s) 112 of FIG. 1 or to perform the method 200 of FIG. 2) is shared, simultaneously serving multiple customers in a flexible, automated fashion. It is standardized, requiring little customization, and it is scalable, providing capacity on demand in a pay-as-you-go model.

The process software can be stored on a shared file system accessible from one or more servers. The process software is executed via transactions that contain data and server processing requests that use CPU units on the accessed server. CPU units are units of time, such as minutes, seconds, and hours, on the central processor of the server. Additionally, the accessed server may make requests of other servers that require CPU units. CPU units are an example that represents but one measurement of use. Other measurements of use include, but are not limited to, network bandwidth, memory usage, storage usage, packet transfers, complete transactions, etc.

When multiple customers use the same process software application, their transactions are differentiated by the parameters included in the transactions that identify the unique customer and the type of service for that customer. All of the CPU units and other measurements of use that are used for the services for each customer are recorded. When the number of transactions to any one server reaches a number that begins to affect the performance of that server, other servers are accessed to increase the capacity and to share the workload. Likewise, when other measurements of use, such as network bandwidth, memory usage, storage usage, etc., approach a capacity so as to affect performance, additional network bandwidth, memory usage, storage, etc. are added to share the workload.

The measurements of use employed for each service and customer are sent to a collecting server that sums the measurements of use for each customer for each service that was processed anywhere in the network of servers that provide the shared execution of the process software. The summed measurements of use units are periodically multiplied by unit costs, and the resulting total process software application service costs are alternatively sent to the customer and/or indicated on a web site accessed by the customer, who may then remit payment to the service provider. The measurements of use can also be used to determine voting weight values.

In another embodiment, the service provider requests payment directly from a customer account at a banking or financial institution.

In another embodiment, if the service provider is also a customer of the customer that uses the process software application, the payment owed to the service provider is reconciled to the payment owed by the service provider to minimize the transfer of payments.

Step 402 begins the On Demand process. A transaction is created that contains the unique customer identification, the requested service type, and any service parameters that further specify the type of service (404). The transaction is then sent to the main server (406). In an On Demand environment, the main server can initially be the only server, and then as capacity is consumed other servers are added to the On Demand environment.

The server central processing unit (CPU) capacities in the On Demand environment are queried (408). The CPU requirement of the transaction is estimated, and then the server's available CPU capacity in the On Demand environment is compared to the transaction CPU requirement to see if there is sufficient CPU available capacity in any server to process the transaction (410). If there is not sufficient server CPU available capacity, then additional server CPU capacity is allocated to process the transaction (412). If there was already sufficient available CPU capacity, then the transaction is sent to a selected server (414).

Before executing the transaction, a check is made of the remaining On Demand environment to determine if the environment has sufficient available capacity for processing the transaction. This environment capacity consists of such things as, but not limited to, network bandwidth, processor memory, storage etc. (416). If there is not sufficient available capacity, then capacity will be added to the On Demand environment (418). Next the required software to process the transaction is accessed, loaded into memory, and then the transaction is executed (420).

The usage measurements are recorded (422). The usage measurements consist of the portions of those functions in the On Demand environment that are used to process the transaction. The usage of such functions as, but not limited to, network bandwidth, processor memory, storage and CPU cycles are what is recorded. The usage measurements are summed, multiplied by unit costs, and then recorded as a charge to the requesting customer (424).

If the customer has requested that the On Demand costs be posted to a web site (426), then they are posted thereto (428). If the customer has requested that the On Demand costs be sent via e-mail to a customer address (430), then they are sent (432). If the customer has requested that the On Demand costs be paid directly from a customer account (434), then payment is received directly from the customer account (436). On Demand process proceeds to 438 and exits.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 5:
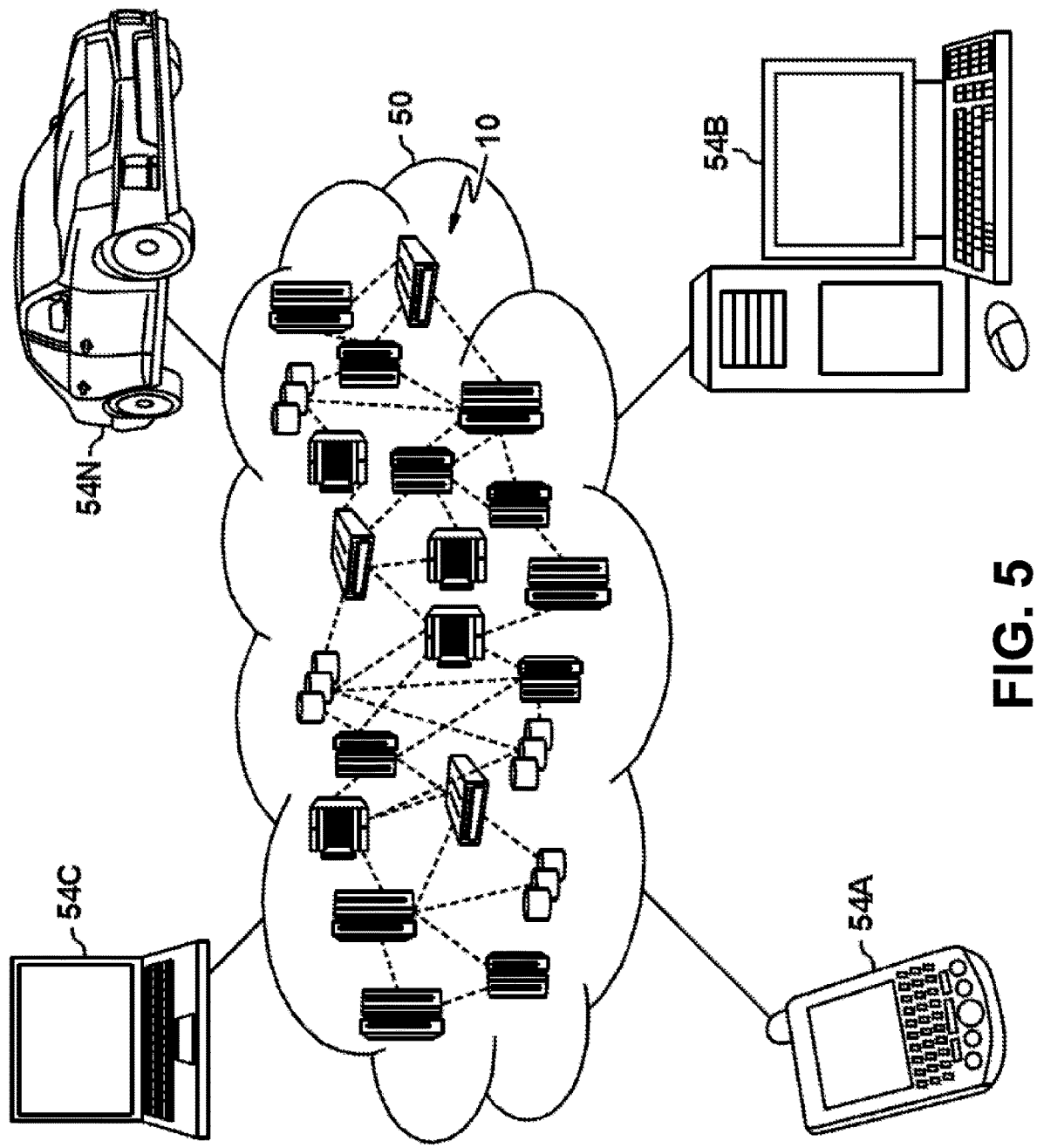
FIG. 5 depicts a cloud computing environment according to an embodiment of the present invention.

Referring now to FIG. 5, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 10 and cloud computing environment 50 can communicate with any type of computerized device over any type of network and/or network addressable connection (e.g., using a web browser).

Figure 6:
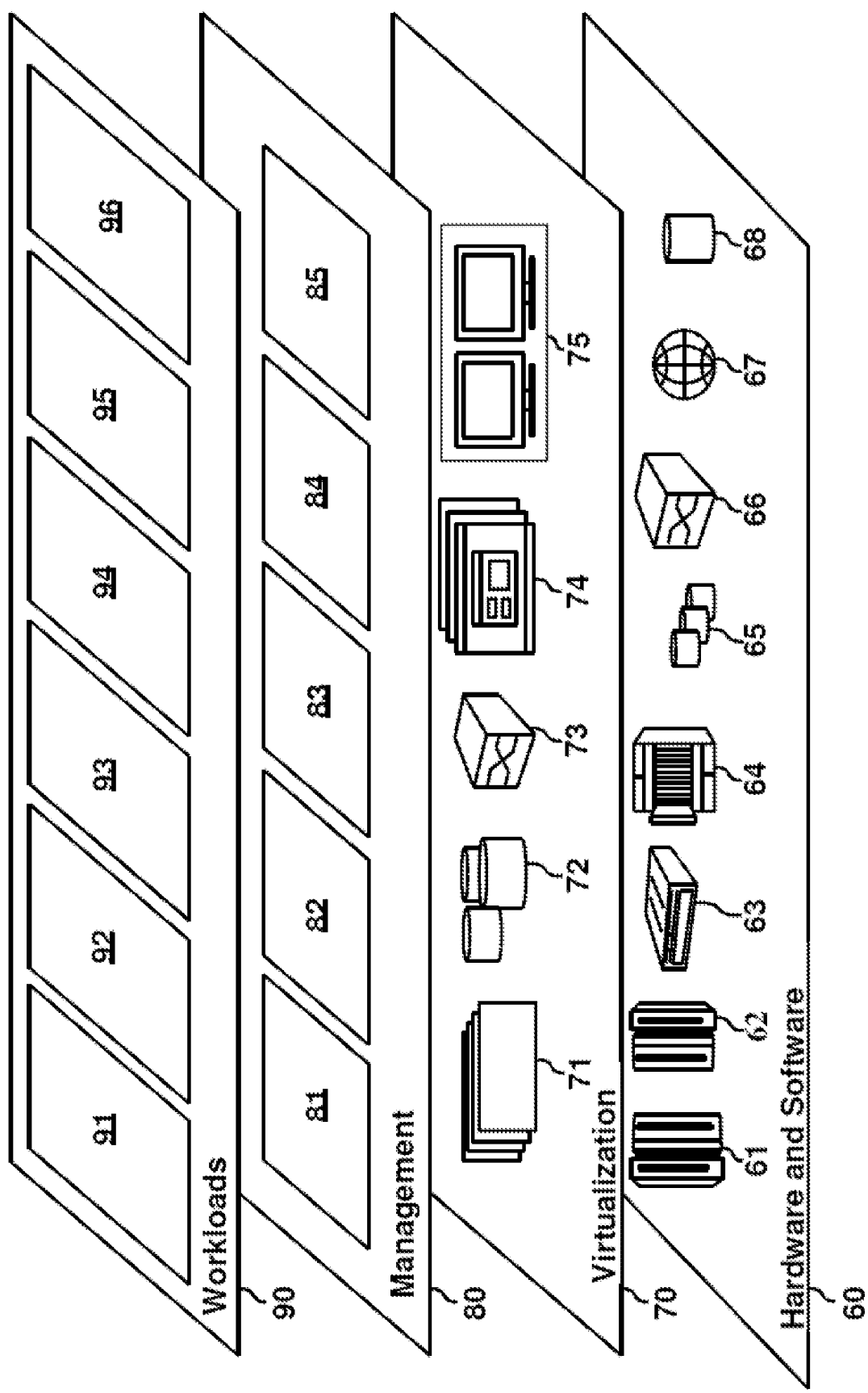
FIG. 6 depicts abstraction model layers according to an embodiment of the present invention.

Referring now to FIG. 6, a set of functional abstraction layers provided by cloud computing environment 50 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and processing 96 associated with the event detection.

FIG. 7 illustrates a diagram of a computing device 702 configured to perform event detection according to an embodiment of the present invention. The computing device 702 may include or correspond to a desktop computer, a laptop computer, a tablet computer, a server, a mainframe, or any other type of computing device.

The computing device includes a processor 704, a transmitter 706, a receiver 708, a user interface 710, and a memory 720. The processor 704, the transmitter 706, the receiver 708, the user interface 710, and the memory 720 may be coupled together via a bus 712 (or another connection). The example illustrated in FIG. 7 is not intended to be limiting, and in other implementations, one or more of the processor 704, the transmitter 706, the receiver 708, the user interface 710, the bus 712, and the memory 720 are optional, or more components may be included in the computing device 702.

The transmitter 706 is configured to enable the computing device 702 to send data to one or more other devices via direct connection or via one or more networks, and the receiver 708 is configured to enable the computing device 702 to receive data from one or more other devices via direct connection or via one or more networks. The one or more networks may include Institute of Electrical and Electronics Engineers (IEEE) 802 wireless networks, Bluetooth networks, telephone networks, optical or radio frequency networks, or other wired or wireless networks. In some implementations, the transmitter 706 and the receiver 708 may be replaced with a transceiver that enables sending and receipt of data from one or more other devices.

The user interface 710 is configured to facilitate user interaction. For example, the user interface 710 is adapted to receive input from a user, to provide output to a user, or a combination thereof. In some implementations, the user interface 710 conforms to one or more standard interface protocols, including serial interfaces (e.g., universal serial bus (USB) interfaces or IEEE interface standards), parallel interfaces, display adapters, audio adaptors, or custom interfaces. In some implementations, the user interface 710 is configured to communicate with one or more input/output devices, such as some combination of buttons, keyboards, pointing devices, displays, speakers, microphones, touch screens, and other devices.

The memory 720 includes volatile memory devices (e.g., random access memory (RAM) devices), nonvolatile memory devices (e.g., read-only memory (ROM) devices, programmable read-only memory, and flash memory), or both. The memory 720 is configured to store instructions 722. The processor 704 is configured to execute the instructions 722 to perform the operations described herein. To illustrate, the processor 704 may execute the instructions 722 to perform media pre-processing, foreground/background separation, object detection, object identification, motion tracking, sonification, audio mixing, feature extraction, or event classification.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method of event detection, the method comprising:
   obtaining, at one or more processors, multimedia data including multiple frames of video data and audio data corresponding to the video data;
   processing, by the one or more processors, the multiple frames of video data to detect at least one object depicted in the video data and to track the at least one object between two or more frames of the multiple frames;
   based on the video data, generating, by the one or more processors, sonification audio data using a sonification process, wherein the sonification audio data is a digital representation of a sound that represents a position of the at least one object in the two or more frames, a movement of the at least one object in the two or more frames, or both the position and the movement of the at least one object in the two or more frames, and wherein generating the sonification audio data comprises:
      mapping, by the one or more processors, one or more audio parameter values included in a look-up table to one or more aspects of data associated with the at least one object, wherein the one or more aspects include at least one of the position and the movement of the at least one object;
   combining, by the one or more processors, the audio data and the sonification audio data; and
   providing, by the one or more processors, input based on the combined audio data and sonification audio data to a trained event classifier to detect an event represented in the multimedia data.

2. The computer-implemented method of claim 1, wherein processing the multiple frames of the video data includes identifying foreground portions of each frame and background portions of each frame, wherein the at least one object is represented in at least one of the foreground portions.

3. The computer-implemented method of claim 1, wherein processing the multiple frames of the video data includes identifying a detected object, wherein the sonification audio data further represents object identification data of the at least one object.

4. The computer-implemented method of claim 1, wherein processing the multiple frames of the video data includes determining a relative size of a detected object within a particular frame, wherein the sonification audio data further represents the relative size of the detected object within the particular frame.

5. The computer-implemented method of claim 1, wherein processing the multiple frames of the video data includes determining relative positions of two or more detected objects within a particular frame, wherein the sonification audio data further represents the relative positions of two or more detected objects within the particular frame.

6. The computer-implemented method of claim 1, wherein combining the audio data and the sonification audio data comprises synchronizing, by the one or more processors, the sonification audio data and the audio data.

7. The computer-implemented method of claim 1, wherein the trained event classifier includes or corresponds to a perceptron, an artificial neural network, a decision tree, naive Bayes classifier, or a support vector machine.

8. The computer-implemented method of claim 1, wherein generating the sonification audio data using a sonification process, wherein the sonification audio data is the digital representation of the sound that represents the position of the at least one object in the two or more frames, comprises:
   determining a first representative coordinate position of a first object in a first frame; and
   determining, based at least partially on the first representative coordinate position, a first audio parameter value to represent the first object.

9. The computer-implemented method of claim 1, wherein the one or more audio parameter values indicate one or more frequencies of a sound, one or more amplitudes of the sound, one or more durations of the sound, modulation of the sound, or a combination thereof.

10. The computer-implemented method of claim 8, wherein generating the sonification audio data using a sonification process, wherein the sonification audio data is the digital representation of the sound that represents the movement of the first object in the two or more frames, further comprises:
   determining a second representative coordinate position of the first object in a second frame;
   determining a difference between the first representative coordinate position and the second representative coordinate location; and
   determining, based at least partially on the difference between the first representative coordinate position and the second representative coordinate position, a second audio parameter value to represent the movement of the first object.

11. The computer-implemented method of claim 1, wherein the multimedia data is obtained from a compressed multimedia stream having a first frame rate and further comprising:

during a first time period, decoding a first segment of the compressed multimedia stream to generate an audio signal and a video signal for a multimedia output device;

during the first time period, generating an output of the trained event classifier, the output indicating a classification assigned to a particular event detected in the first segment of the compressed multimedia stream; and concurrently providing to the multimedia output device, at the first frame rate, the audio signal, the video signal, and the output indicating the classification assigned to the particular event.

12. The computer-implemented method of claim 1, wherein the sonification audio data corresponds to one or more sounds outside a human auditory range.

13. A system for event detection, the system comprising:
one or more processors; and
one or more memory devices coupled to the one or more processors, the one or more memory devices storing instructions that are executable by the one or more processors to perform operations including:
obtaining multimedia data including multiple frames of video data and audio data corresponding to the video data;
processing the multiple frames of video data to detect at least one object depicted in the video data and to track the at least one object between two or more frames of the multiple frames;
based on the video data, generating sonification audio data using a sonification process, wherein the sonification audio data is a digital representation of a sound that represents a position of the at least one object in the two or more frames, movement of the at least one object in the two or more frames, or both the position and the movement of the at least one object in the two or more frames, and wherein generating the sonification audio data comprises:
mapping one or more audio parameter values included in a look-up table to one or more aspects of data associated with the at least one object, wherein the one or more aspects include at least one of the position and the movement of the at least one object;
combining the audio data and the sonification audio data; and
providing input based on the combined audio data and sonification audio data to a trained event classifier to detect an event represented in the multimedia data.

14. The system of claim 13, wherein processing the multiple frames of the video data includes identifying a detected object, wherein the sonification audio data further represents identification data of the at least one object.

15. The system of claim 13, wherein processing the multiple frames of the video data includes determining a relative size of a detected object within a particular frame, wherein the sonification audio data further represents the relative size of the detected object within the particular frame.

16. The system of claim 13, wherein processing the multiple frames of the video data includes determining relative positions of two or more detected objects within a particular frame, wherein the sonification audio data further represents the relative positions of two or more detected objects within the particular frame.

17. The system of claim 13, wherein the input includes one or more feature vectors representing the combined audio data.

18. The system of claim 13, further comprising:
wherein generating the sonification audio data using a sonification process, wherein the sonification audio data is the digital representation of the sound that represents the position of the at least one object in the two or more frames, comprises:
determining a first representative coordinate location of a first object in a first frame;
determining, based at least partially on the first representative coordinate location, a first audio parameter value to represent the first object; and
wherein generating the sonification audio data, wherein the sonification audio data is the digital representation of the sound that represents the movement of the first object in the two or more frames further comprises:
determining a second representative coordinate location of the first object in a second frame;
determining a difference between the first representative coordinate location and the second representative coordinate location; and
determining, based at least partially on the difference between the first representative coordinate location and the second representative coordinate location, a second audio parameter value to represent the movement of the first object.

19. The system of claim 13, wherein the sonification audio data corresponds to one or more sounds outside a human auditory range.

20. A computer program product for event detection, the computer program product comprising a computer readable storage medium having program instructions embodied therewith, the program instructions executable by one or more processors to perform operations including:
obtaining multimedia data including multiple frames of video data and audio data corresponding to the video data;
processing the multiple frames of video data to detect at least one object depicted in the video data and to track the at least one object between two or more frames of the multiple frames;
based on the video data, generating sonification audio data using a sonification process, wherein the sonification audio data is a digital representation of a sound that represents a position of the at least one object in the two or more frames, movement of the at least one object in the two or more frames, or both the position and the movement of the at least one object in the two or more frames, and wherein generating the sonification audio data comprises:
mapping one or more audio parameter values included in a look-up table to one or more aspects of data associated with the at least one object, wherein the one or more aspects include at least one of the position and the movement of the at least one object;
combining the audio data and the sonification audio data; and
providing input based on the combined audio data and sonification audio data to a trained event classifier to detect an event represented in the multimedia data.

\* \* \* \* \*